UNITED STATES PATENT OFFICE.

WILLIAM HENRY PERKIN, OF OXFORD, AND SAMUEL BRADBURY, OF ASHTON-UPON-MERSEY, ENGLAND.

TREATMENT OF COTTON AND COTTON GOODS AND OTHER COMBUSTIBLE SUBSTANCES TO RENDER THEM PERMANENTLY LESS INFLAMMABLE.

1,224,205.

Specification of Letters Patent.   Patented May 1, 1917.

No Drawing.   Application filed July 31, 1914. Serial No. 854,355.

*To all whom it may concern:*

Be it known that we, WILLIAM HENRY PERKIN, Ph. D., F. R. S., a resident of Oxford, in the county of Oxford, England, and SAMUEL BRADBURY, F. C. S., a resident of Ashton-upon-Mersey, in the county of Chester, England, both subjects of the King of Great Britain and Ireland, have invented certain new and useful Improvements in the Treatment of Cotton and Cotton Goods and other Combustible Substances to Render Them Permanently Less Inflammable, of which the following is a specification.

In the specification to prior British Letters Patent Nos. 8509 of 1902 and 9620 of 1902 granted to the first named applicant and others there is described a process of rendering cotton and other vegetable fibers and fabrics less inflammable by treatment with a solution of an alkali metal salt containing a metal in its acid radical. In British specification No. 9620 of 1902 solutions of certain organic acids and salts of ammonia are described for fixing the salts referred to.

This invention relates to the treatment and impregnation of the above indicated fibers or fabrics and other suitable permeable combustible substances with solutions of the above indicated soluble salts containing a metal in its acid radical, for the purpose of rendering such substances permanently less inflammable even after repeated washings with soap, and consists in subjecting so treated and impregnated substances, after drying them sufficiently to deposit the salt therein, to an atmosphere containing a suitable gas capable of rendering the deposited salt insoluble, preferably the vapor from or of a suitable weak acid such as $CO_2$ or $SO_2$. The exposure to the atmosphere containing the gas preferably takes place in the presence of moisture. The object of the invention is to materially reduce the cost of the chemical agents employed and to effect a material decrease in the time and labor required. After treatment with the gas and fixation thereby of the fireproofing salt, the fabric or other substance may be washed and dried.

Steam may be employed in or as the gas containing atmosphere for the purpose of producing the preferred moist conditions to enable the gas to readily act upon and fix the salt which has been deposited in the substance. If desired, however, the moist condition may be obtained by placing the treated and dried substance in a suitable moist atmosphere previous to the treatment with gas, or by subjecting it to a fine spray previous to or during the treatment with gas. Or the requisite amount of moisture may be obtained by absorption from the air.

The time required to fix the fireproofing salt may be reduced by increasing the temperature at which reaction with the gas takes place. Thus, even when steam is employed the gas may be separately heated. Or the desired temperature may be attained by the heat set up as a result of and during the chemical changes which take place under certain conditions, as in the case of a comparatively large mass of substance being treated with gas. The gas may be heated to hasten the fixation of the fireproofing salt.

In the examples given in the cited prior British specifications three different processes were required for the complete treatment of the substance to be fireproofed, viz., (1) impregnation with the solution of a salt and drying; (2) impregnation with a second solution of some body which would combine with and fix the salt and drying; and (3) washing and drying. The process of the present invention is shorter, inasmuch as the second impregnation and drying are eliminated, and the treatment with gas may follow immediately after the first treatment and as part of that process, or may take place previously to the last washing treatment and as a preliminary stage to such treatment.

Ordinary fabrics may be treated by simple immersion in a solution of a salt as hereinbefore indicated, followed (after drying) by simple exposure to the described atmosphere, but raw cotton, wood, closely woven fabrics and other substances not easily permeable by liquids or gases may have the liquid and gas or either forced or drawn through them in any known and suitable way.

The strength of the solutions may vary according to the material acted upon and the degree of fireproofing required.

The gas employed may be produced in any known and suitable manner.

The following are examples of how this invention may be carried into effect for the purpose of rendering flannelet permanently less inflammable even after repeated washings with soap.

Example 1. The flannelet is first impregnated with a solution of sodium aluminate at 35° Tw. and is then squeezed and dried. It is then passed through an aging or other suitable machine into which steam and carbonic acid gas are allowed to enter as required. After the treatment with the gas is finished the material is washed and again dried.

Example 2: The flannelet is first impregnated with a solution of sodium stannate at 45° Tw. and is then squeezed and dried. It is then passed through an aging or other suitable machine into which steam and carbonic acid gas are allowed to enter as required. After the treatment with the gas is finished the material is washed and again dried.

Example 3: The flannelet is impregnated and dried as in Example 2. It is then passed through an aging or other suitable machine into which steam and sulfur dioxid are allowed to enter as required. After the treatment with the gas is finished the material is washed and again dried.

To obtain the best commercial results it is essential not only that the indicated salt must first be dried and deposited in the substance but that the moisture present during the treatment with gas must not be in such quantity as to disturb the condition established in the substance by the drying of the salt.

What we claim is:—

1. The process of rendering cotton goods and other suitable permeable substances permanently less inflammable, which comprises treating said permeable substances with a solution of an alkali metal salt containing a metal in its acid radical, and subsequently drying the substances thus treated, then treating the dried substances with a gas in the presence of moisture which is capable of forming with the alkali metal salt an insoluble compound of the metal which renders the substances less inflammable and a soluble compound which may thereafter be washed away, while confining the amount of moisture present to such quantities as not to disturb the conditions established in the substance by the previous drying, and finally washing the thus treated substances to remove the soluble compound formed in the last reaction, and subsequently drying.

2. The process of rendering cotton goods and other suitable permeable substances permanently less inflammable, which comprises treating said permeable substances with a solution of an alkali metal salt containing a metal in its acid radical, and subsequently drying the substances thus treated, then treating the dried substances with sulfur dioxid gas in the presence of moisture, the moisture present being in such quantities as not to disturb the conditions established in the substances by the previous drying, and finally washing the thus treated substances to remove the soluble sulfites and again drying the substances.

3. The process of rendering cotton goods and other suitable permeable substances permanently less inflammable, which comprises treating said permeable substances with a solution of an alkali metal aluminate and subsequently drying the material thus treated, then treating the dried substances with sulfur dioxid gas in the presence of moisture, the moisture present being in such quantities as not to disturb the conditions established in the substances by the previous drying, and finally washing the thus treated substances to remove the soluble sulfites, and again drying the substances.

4. The process of rendering cotton goods and other suitable permeable substances permanently less inflammable, which comprises treating said permeable substances with a solution of an alkali metal salt containing a metal in its acid radical, and subsequently drying the substances thus treated, then treating the dried substances with sulfur dioxid gas under pressure in the presence of moisture, the moisture present being in such quantities as not to disturb the conditions established in the substances by the previous drying, and finally washing the thus treated substances to remove the soluble sulfites, and again drying.

5. The process of rendering cotton goods and other suitable permeable substances permanently less inflammable, which comprises treating said permeable substances with a solution of an alkali metal aluminate, and subsequently drying the substances thus treated, then treating the dried substances with sulfur dioxid gas under pressure in the presence of moisture, the moisture present being in such quantities as not to disturb the conditions established in the substances by the previous drying, and finally washing the thus treated substances to remove the soluble sulfites, and again drying.

In witness whereof we have hereunto set our hands in the presence of two subscribing witnesses.

WILLIAM HENRY PERKIN.

Witnesses:
CECIL ANTHONY HOBAN,
ALBERT EDWARD HOLTON.

SAMUEL BRADBURY.

Witnesses:
JOHN O'CONNELL,
FRANK A. HEYS.